Feb. 12, 1924.
W. T. PRICE
FILTER
Filed May 14, 1921
1,483,111
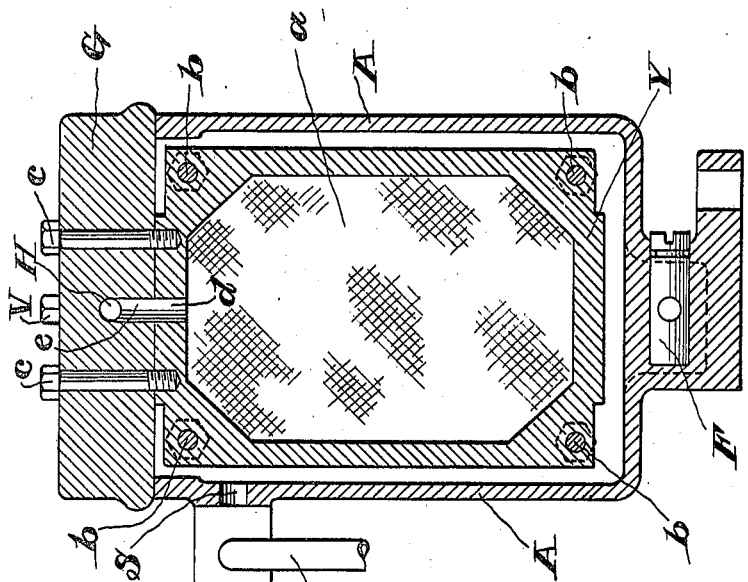
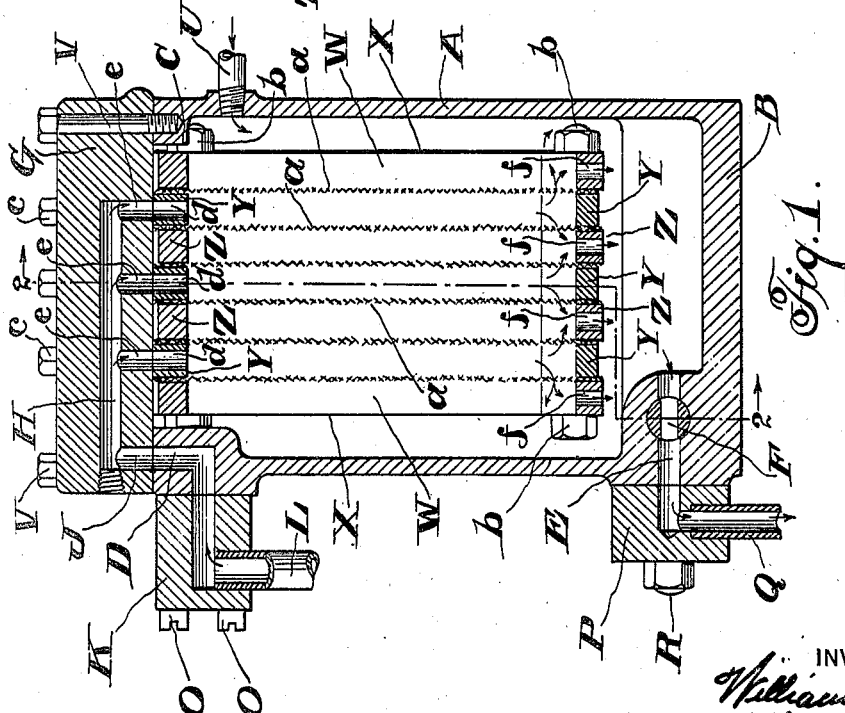

Patented Feb. 12, 1924.

1,483,111

UNITED STATES PATENT OFFICE.

WILLIAM T. PRICE, DECEASED, LATE OF EASTON, PENNSYLVANIA; BY HELEN C. PRICE, EXECUTRIX, OF EASTON, PENNSYLVANIA, ASSIGNOR TO PRICE ENGINE CORPORATION, OF NEW YORK, N. Y., A CORPORATION OF NEW YORK.

FILTER.

Application filed May 14, 1921. Serial No. 469,439.

*To all whom it may concern:*

Be it known that WILLIAM T. PRICE, deceased, late a citizen of the United States, who resided at Easton, Northampton County, Pennsylvania, did invent certain new and useful Improvements in Filters, of which the following is a specification.

This invention relates to filters, but more particularly to a filter for oil and other liquids, and the primary object of the invention is to secure a simple and efficient filter which is capable of continuously filtering heavy fuel oil and which consists essentially of two units one of which carries the filtering means proper and may be readily removed for cleaning without disturbing the other, and may furthermore be readily disassembled.

To these and other ends the invention is shown in its preferred form in the accompanying drawings, in which—

Figure 1 is a transverse sectional elevation of a filter, and

Figure 2 is a longitudinal sectional elevation on the line 2—2 of Figure 1.

The filter about to be described in detail consists in effect of a stationary casing or body having the requisite inlet and outlet and adapted to be permanently secured to the pipes for circulating the liquid to be filtered, and a unit removable from the body or casing as such and comprising the entire filtering means proper and a cover for the stationary body or casing carrying said filtering means and completing the connection between one of the pipes for circulating liquid to be filtered and the said filtering means, whereby the entire insides of the filter may be removed with the cover for cleaning without disturbing the body of the filter.

Referring to the drawings, a suitable body or casing A, closed at the bottom B and open at the top C, is provided with an inlet D, and outlet E having a valve F. This body or casing A constitutes one of the two units which make up the filter and is permanently secured to the pipes for circulating the liquid to be filtered. The other and removable unit consists of the entire filtering means proper and the cover by which it is carried. This cover G is formed with an inlet passage H, communicating with the inlet D in the casing, through the aperture J which registers therewith when the cover is in place. A pipe connection K for the inlet pipe L may be suitably connected to the casing over the inlet D as by means of the bolts O, and a pipe connection P having an outlet pipe Q may be connected to the casing over the outlet E as by means of the bolt R. These connections are intended to be permanent and need not be disturbed in removing the filtering means proper for cleaning. The casing may also be provided with an overflow opening S communicating with the overflow pipe T and if desired, an additional pipe connection U leading to the interior of the casing may connect with a by-pass when required.

The unit constituted by the cover G and the filtering means carried by it, is removably connected to the casing as by means of the bolts V, the entire filter means proper being suspended from the cover G within the casing at right angles to the cover. When the said unit is removed only the body or casing remains, no interference therewith being necessary. The filter member which is the filtering means proper comprises a series of frames, of which the outer frames W preferably have open outer sides X, uncovered with fabric, while the inner frames Y and Z are open from side to side but covered on both sides with filter fabric *a* which may be of any desired material suitable for the purpose. The filter fabric *a* is stretched between the frames as shown, and the frames are suitably clamped together as by means of the transverse bolts *b*. The filter member may be suspended at right angles from the cover G as by means of the bolts *c*.

Every other filter frame Y is provided with an inlet aperture *d* registering with a corresponding aperture *e* communicating with the inlet passage H in the cover G, and the end frames W and the intermediate frames Z are provided with apertures *f* communicating with the interior of the casing from which the liquid may pass through the outlet E for use as desired, as for instance, in the injection pump of an oil engine of the injection type. By this means all the frames are made interchangeable as desired.

In the operation of the filter, liquid which may be under high pressure, enters the filter through the pipe L, inlet D, inlet passage H and is filtered through the filter fabrics *a* and passes out into the casing through the apertures *f* in the filter frames and through the open sides of the outer frames and thence through the outlet E and pipe Q to the point of use. Any overflow of liquid is carried off through the overflow outlet S and pipe T back to the source of supply or other storage receptacle, and if desired a by-pass pipe may be connected from the point of use of the liquid back to the by-pass connection U in the casing A.

Claims:

1. A filter comprising a casing having an inlet and outlet for the circulation of liquid, a cover for said casing, a removable filter member suspended at right angles from said cover and comprising filter elements in the form of frames having filter fabric stretched thereon, the outer frames of the filter elements having open outer sides, and means for clamping said filter elements together, certain of said filter elements communicating with the inlet of the casing and elements alternate thereto communicating with the outlet of the casing.

2. A filter comprising a casing having an inlet, an outlet, an overflow, and a removable cover having a passage communicating with said inlet, a filter member suspended from said cover and comprising interchangeable filter elements in the form of frames, every other frame having an inlet opening at one end adapted to communicate with the inlet passage in the cover, and each intermediate frame having an outlet opening at the opposite end adapted to communicate with the interior of the casing, filter fabrics stretched between said frames, and means for clamping said frames together.

3. A filter comprising a casing having an inlet and an outlet for the circulation of liquid, a cover for said casing having a passage communicating with the inlet, filter elements in the form of frames having filter fabric stretched thereon and suspended at right angles from the cover, the outer frames of the filter elements having open outer sides, and means for clamping said filter elements together at the top and bottom, certain of said filter elements communicating with the inlet of the casing and elements alternate thereto communicating with the outlet of the casing.

4. A filter comprising a casing having an inlet and an outlet, for the circulation of liquid, a removable cover having a passage communicating with the inlet, filter elements in the form of frames having filter fabric stretched thereon, and suspended at right angles from the cover, ports in the cover communicating with said passage, the outer frames of the filter elements having open outer sides, means at the top and the bottom for clamping the filter elements together, and means for removably securing the filter elements to the cover, certain of said filter elements communicating with the inlet of the casing and elements alternate thereto communicating with the outlet of the casing.

In testimony whereof I have signed this specification, as executrix.

HELEN C. PRICE,
*Sole Executrix of the Estate of William T. Price, Deceased.*